United States Patent
Yan (10) Patent No.: US 10,291,587 B2
(45) Date of Patent: May 14, 2019

(54) METHOD AND APPARATUS FOR ANONYMOUS AND TRUSTWORTHY AUTHENTICATION IN PERVASIVE SOCIAL NETWORKING

(71) Applicant: Nokia Technologies Oy, Espoo (FI)

(72) Inventor: Zheng Yan, Shaanxi (FI)

(73) Assignee: Nokia Technologies Oy, Espoo (FI)

( * ) Notice: Subject to any disclaimer, the term of this patent is extended or adjusted under 35 U.S.C. 154(b) by 153 days.

(21) Appl. No.: 14/896,988

(22) PCT Filed: Jun. 25, 2013

(86) PCT No.: PCT/CN2013/077856
§ 371 (c)(1),
(2) Date: Dec. 9, 2015

(87) PCT Pub. No.: WO2014/205645
PCT Pub. Date: Dec. 31, 2014

(65) Prior Publication Data
US 2016/0127341 A1 May 5, 2016

(51) Int. Cl.
*H04L 29/06* (2006.01)
*H04L 9/32* (2006.01)
(Continued)

(52) U.S. Cl.
CPC ............ *H04L 63/0421* (2013.01); *H04L 9/32* (2013.01); *H04L 9/3213* (2013.01);
(Continued)

(58) Field of Classification Search
CPC H04L 63/0421; H04L 63/0807; H04L 9/3213
See application file for complete search history.

(56) References Cited

U.S. PATENT DOCUMENTS 7,181,620 B1 * 2/2007 Hur .................... H04L 9/083
713/168
8,225,385 B2 * 7/2012 Chow .................. H04L 63/08
713/168
(Continued)

FOREIGN PATENT DOCUMENTS

CN 1898936 A 1/2007
CN 101110762 A 1/2008
(Continued)

OTHER PUBLICATIONS

Cao, Tianjie; Lin, Dongdai; Xue, Rui; "Security Analysis of Some Batch Verifying Signatures from Pairings", International Journal of Network Security, vol. 3, No. 2, Sep. 2006, pp. 138-143.*
(Continued)

*Primary Examiner* — Victor Lesniewski
(74) *Attorney, Agent, or Firm* — Mintz Levin Cohn Ferris Glovsky and Popeo, P.C.

(57) ABSTRACT

A method for anonymous authentication may comprise: issuing token information to a first node registered with a network entity, wherein the token information indicates one or more tokens for the first node; distributing a token list to a plurality of nodes registered with the network entity, wherein the token list is associated with respective tokens for the plurality of nodes comprising at least the first node and a second node, and wherein the token information and the token list are used for an anonymous authentication between the first node and the second node.

12 Claims, 6 Drawing Sheets

(51) Int. Cl.
*H04W 4/21* (2018.01)
*H04W 4/20* (2018.01)

(52) U.S. Cl.
CPC .......... *H04L 9/3247* (2013.01); *H04L 9/3273* (2013.01); *H04L 63/0407* (2013.01); *H04L 63/06* (2013.01); *H04L 63/08* (2013.01); *H04L 63/0807* (2013.01); *H04L 63/0884* (2013.01); *H04L 2209/38* (2013.01); *H04L 2209/42* (2013.01); *H04L 2209/601* (2013.01); *H04W 4/206* (2013.01); *H04W 4/21* (2018.02)

(56) References Cited

U.S. PATENT DOCUMENTS

| | | | | |
|---|---|---|---|---|
| 8,327,131 | B1* | 12/2012 | Hardjono | H04L 63/0823 713/155 |
| 8,769,259 | B2* | 7/2014 | Broustis | H04L 9/0822 713/152 |
| 8,966,599 | B1* | 2/2015 | Barrows | H04L 63/08 705/37 |
| 2005/0091543 | A1* | 4/2005 | Holtzman | G06F 21/31 726/19 |
| 2005/0120214 | A1* | 6/2005 | Yeates | H04L 63/08 713/171 |
| 2006/0174334 | A1 | 8/2006 | Perlin et al. | |
| 2007/0192619 | A1* | 8/2007 | Gifford | G06F 21/32 713/185 |
| 2007/0192843 | A1* | 8/2007 | Peterson | H04L 9/3213 726/10 |
| 2008/0103854 | A1* | 5/2008 | Adam | G06F 21/6218 705/344 |
| 2009/0222656 | A1* | 9/2009 | Rouskov | H04L 9/0825 713/155 |
| 2010/0175119 | A1* | 7/2010 | Vitaletti | G06F 21/6218 726/9 |
| 2010/0325441 | A1* | 12/2010 | Laurie | G06F 21/31 713/185 |
| 2011/0078775 | A1* | 3/2011 | Yan | G06F 21/57 726/6 |
| 2011/0119744 | A1* | 5/2011 | Cho | H04L 9/3234 726/6 |
| 2011/0154056 | A1* | 6/2011 | Spalka | G06F 21/6245 713/189 |
| 2011/0202991 | A1 | 8/2011 | Paquin et al. | |
| 2011/0225114 | A1 | 9/2011 | Gotthardt | |
| 2011/0302412 | A1* | 12/2011 | Deng | H04L 63/0407 713/159 |
| 2012/0023568 | A1* | 1/2012 | Cha | G06F 21/335 726/10 |
| 2012/0167189 | A1* | 6/2012 | Aichroth | H04L 9/006 726/7 |
| 2012/0204032 | A1* | 8/2012 | Wilkins | H04L 9/006 713/170 |
| 2012/0226813 | A1* | 9/2012 | Ragusa | G06F 9/5027 709/227 |
| 2012/0260322 | A1* | 10/2012 | Logan | G06F 21/33 726/6 |
| 2012/0311686 | A1* | 12/2012 | Medina | H04L 63/0807 726/7 |
| 2013/0007869 | A1* | 1/2013 | Thomas | G06F 21/335 726/9 |
| 2013/0067081 | A1* | 3/2013 | Liu | H04W 12/06 709/225 |
| 2013/0145148 | A1* | 6/2013 | Shablygin | H04L 63/0853 713/155 |
| 2013/0145172 | A1* | 6/2013 | Shablygin | G06F 21/33 713/185 |
| 2013/0145173 | A1* | 6/2013 | Shablygin | G06F 21/34 713/185 |
| 2013/0208893 | A1* | 8/2013 | Shablygin | H04L 9/0822 380/277 |
| 2013/0226813 | A1* | 8/2013 | Voltz | G06Q 20/38215 705/67 |
| 2013/0276086 | A1* | 10/2013 | Yu | H04L 63/00 726/9 |
| 2014/0025753 | A1* | 1/2014 | Gronowski | H04L 63/0421 709/206 |
| 2014/0074720 | A1* | 3/2014 | Al-Herz | G06Q 20/40 705/67 |
| 2014/0074721 | A1* | 3/2014 | Al-Herz | G06Q 30/06 705/71 |
| 2014/0245420 | A1* | 8/2014 | Tidwell | H04L 65/40 726/10 |
| 2014/0317736 | A1* | 10/2014 | Cao | H04L 63/1483 726/23 |

FOREIGN PATENT DOCUMENTS

| | | |
|---|---|---|
| CN | 102150448 A | 8/2011 |
| WO | 2011/153539 A1 | 12/2011 |
| WO | 2013/131244 A1 | 9/2013 |
| WO | 2013/143144 A1 | 10/2013 |
| WO | 2014/059622 A1 | 4/2014 |

OTHER PUBLICATIONS

Yan et al., "A Practical Reputation System for Pervasive Social Chatting", Journal of Computer and System Sciences, vol. 79, No. 5, Aug. 2013, pp. 556-572.

Raya et al., "The Security of Vehicular Ad Hoc Networks", Proceedings of the 3rd ACM workshop on Security of ad hoc and sensor networks, Nov. 7, 2005, pp. 11-21.

Raya et al., "Securing Vehicular Ad Hoc Networks", Journal of Computer Security—Special Issue on Security of Ad-hoc and Sensor Networks, vol. 15, No. 1, Jan. 2007, pp. 39-68.

Lin et al., "TSVC: Timed Efficient and Secure Vehicular Communications With Privacy Preserving", IEEE Transactions on Wireless Communications, vol. 7, No. 12, Dec. 2008, pp. 4987-4998.

Kozhemyak, "Privacy Considerations for Secure Identification in Social Wireless Networks", Masters thesis, Sep. 2011, 104 pages.

Martucci, "Identity and Anonymity in Ad Hoc Networks", Dissertation, 2009, 222 pages.

Extended European Search Report received for corresponding European Patent Application No. 13888311.1, dated Jan. 13, 2017, 7 pages.

Au et al., "Dynamic Universal Accumulators for DDHGroups and Their Application to Attribute-Based Anonymous Credential Systems", Topics in Cryptology—CT-RSA, vol. 5473, 2009, pp. 295-308.

Zhang et al., "Universal Identity Management Model Based on Anonymous Credentials", IEEE International Conference on Services Computing, Jul. 5-10, 2010, pp. 305-312.

International Search Report and Written Opinion received for corresponding Patent Cooperation Treaty Application No. PCT/CN2013/077856, dated Mar. 27, 2014, 13 pages.

* cited by examiner

METHOD AND APPARATUS FOR ANONYMOUS AND TRUSTWORTHY AUTHENTICATION IN PERVASIVE SOCIAL NETWORKING

RELATED APPLICATION

This application was originally filed as Patent Cooperation Treaty Application No. PCT/CN2013/077856 filed Jun. 25, 2013.

FIELD OF THE INVENTION

The present invention generally relates to social communications. More specifically, the invention relates to anonymous and trustworthy authentication in Pervasive Social Networking (PSN).

BACKGROUND

The modern communications era has brought about a tremendous expansion of communication networks. Communication service providers and device manufacturers are continually challenged to deliver value and convenience to consumers by, for example, providing compelling network services, applications, and contents. The development of communication technologies has contributed to an insatiable desire for new functionality. Through a communication system such as Mobile Ad Hoc Network (MANET), a social group could be instantly formed by not only people socially connected, but also strangers physically in proximity for conducting instant social activities. This kind of Pervasive Social Networking (PSN) is an essential complement to the Internet on-line social networking and can be very valuable for mobile users, especially when the Internet or cellular networks are temporarily unavailable or costly to access. Trust plays an important role in PSN for reciprocal activities among nearby strangers. It helps people to overcome perceptions of uncertainty and risk and engage in "trust-related behaviors". During the instant social activities, users are not necessarily acquaintances but more likely strangers. Therefore the users need to balance between benefits received in such reciprocal activities and risks related to communicating with strangers. In this context, it is desirable to authenticate communication parties without knowing their real identities, and at the same time ensure the trustworthiness of authentication in an anonymous way in order to achieve both privacy and security protection.

SUMMARY

The present description introduces an efficient, anonymous and trustworthy authentication solution in the context of online, mobile or pervasive social networking, which can achieve privacy preservation and anonymous authentication.

According to a first aspect of the present invention, there is provided a method comprising: issuing token information to a first node registered with a network entity, wherein the token information indicates one or more tokens for the first node; distributing a token list to a plurality of nodes registered with the network entity, wherein the token list is associated with respective tokens for the plurality of nodes comprising at least the first node and a second node, and wherein the token information and the token list are used for an anonymous authentication between the first node and the second node.

According to a second aspect of the present invention, there is provided an apparatus comprising: at least one processor; and at least one memory comprising computer program code, the at least one memory and the computer program code configured to, with the at least one processor, cause the apparatus to perform at least the following: issuing token information to a first node registered with the apparatus, wherein the token information indicates one or more tokens for the first node; distributing a token list to a plurality of nodes registered with the apparatus, wherein the token list is associated with respective tokens for the plurality of nodes comprising at least the first node and a second node, and wherein the token information and the token list are used for an anonymous authentication between the first node and the second node.

According to a third aspect of the present invention, there is provided a computer program product comprising a computer-readable medium bearing computer program code embodied therein for use with a computer, the computer program code comprising: code for issuing token information to a first node registered with a network entity, wherein the token information indicates one or more tokens for the first node; code for distributing a token list to a plurality of nodes registered with the network entity, wherein the token list is associated with respective tokens for the plurality of nodes comprising at least the first node and a second node, and wherein the token information and the token list are used for an anonymous authentication between the first node and the second node.

According to a fourth aspect of the present invention, there is provided an apparatus comprising: issuing means for issuing token information to a first node registered with the apparatus, wherein the token information indicates one or more tokens for the first node; distributing means for distributing a token list to a plurality of nodes registered with the apparatus, wherein the token list is associated with respective tokens for the plurality of nodes comprising at least the first node and a second node, and wherein the token information and the token list are used for an anonymous authentication between the first node and the second node.

In an exemplary embodiment, the one or more tokens for the first node may comprise: a first token for the first node, at least one backup token of the first token, or a combination thereof; and the respective tokens for the plurality of nodes may comprise at least: the first token for the first node, the at least one backup token of the first token, a second token for the second node, and at least one backup token of the second token. According to an exemplary embodiment, the first token may comprise: a first validity period, and a pseudonym identifier and a trust value of the first node corresponding to the first validity period; and a backup token of the first token may comprise: an extended first validity period, and a pseudonym identifier and a trust value of the first node corresponding to the extended first validity period. For example, the trust value of the first node corresponding to the extended first validity period may be set based at least in part on an analysis of a change trend within the extended first validity period according to a trust value change pattern generated based at least in part on historical statistics for the first node.

In an exemplary embodiment, the token list may comprise an aggregated list of hashed tokens which is certified by the network entity, and can be updated based at least in part on a change of the respective tokens for the plurality of nodes. Particularly, the network entity may comprise a trusted server which is authorized for social networking participated by the plurality of the nodes.

According to a fifth aspect of the present invention, there is provided a method comprising: obtaining token information from a network entity with which a first node is registered, wherein the token information indicates one or more tokens for the first node; generating security information for the first node based at least in part on the token information; and sending a message with authentication information to a second node from the first node, wherein the authentication information is associated with the security information and used for an anonymous authentication between the first node and the second node.

According to a sixth aspect of the present invention, there is provided an apparatus comprising: at least one processor; and at least one memory comprising computer program code, the at least one memory and the computer program code configured to, with the at least one processor, cause the apparatus to perform at least the following: obtaining token information from a network entity with which the apparatus is registered, wherein the token information indicates one or more tokens for the apparatus; generating security information for the apparatus based at least in part on the token information; and sending a message with authentication information to another apparatus from the apparatus, wherein the authentication information is associated with the security information and used for an anonymous authentication between the apparatus and the another apparatus.

According to a seventh aspect of the present invention, there is provided a computer program product comprising a computer-readable medium bearing computer program code embodied therein for use with a computer, the computer program code comprising: code for obtaining token information from a network entity with which a first node is registered, wherein the token information indicates one or more tokens for the first node; code for generating security information for the first node based at least in part on the token information; and code for sending a message with authentication information to a second node from the first node, wherein the authentication information is associated with the security information and used for an anonymous authentication between the first node and the second node.

According to an eighth aspect of the present invention, there is provided an apparatus comprising: obtaining means for obtaining token information from a network entity with which the apparatus is registered, wherein the token information indicates one or more tokens for the apparatus; generating means for generating security information for the apparatus based at least in part on the token information; and sending means for sending a message with authentication information to another apparatus from the apparatus, wherein the authentication information is associated with the security information and used for an anonymous authentication between the apparatus and the another apparatus.

According to exemplary embodiments, the apparatus in the sixth/eighth aspect of the present invention may comprise a first node, and the another apparatus in the sixth/eighth aspect of the present invention may comprise a second node. In accordance with an exemplary embodiment, the security information may comprise a short-lived public and private key pair for the first node. The authentication information may comprise: the short-lived public key of the first node, and a signature generated by using the short-lived private key of the first node.

According to a ninth aspect of the present invention, there is provided a method comprising: obtaining, from a network entity, a token list associated with respective tokens for a plurality of nodes registered with the network entity, wherein the plurality of nodes comprise at least a first node and a second node; receiving a message with authentication information from the first node, wherein the authentication information is associated with a token for the first node; and performing an anonymous authentication between the first node and the second node based at least in part on the authentication information and the token list.

According to a tenth aspect of the present invention, there is provided an apparatus comprising: at least one processor; and at least one memory comprising computer program code, the at least one memory and the computer program code configured to, with the at least one processor, cause the apparatus to perform at least the following: obtaining, from a network entity, a token list associated with respective tokens for a plurality of nodes registered with the network entity, wherein the plurality of nodes comprise at least the apparatus and another apparatus; receiving a message with authentication information from the another apparatus, wherein the authentication information is associated with a token for the another apparatus; and performing an anonymous authentication between the apparatus and the another apparatus based at least in part on the authentication information and the token list.

According to a eleventh aspect of the present invention, there is provided a computer program product comprising a computer-readable medium bearing computer program code embodied therein for use with a computer, the computer program code comprising: code for obtaining, from a network entity, a token list associated with respective tokens for a plurality of nodes registered with the network entity, wherein the plurality of nodes comprise at least a first node and a second node; code for receiving a message with authentication information from the first node, wherein the authentication information is associated with a token for the first node; and code for performing an anonymous authentication between the first node and the second node based at least in part on the authentication information and the token list.

According to a twelfth aspect of the present invention, there is provided an apparatus comprising: obtaining means for obtaining, from a network entity, a token list associated with respective tokens for a plurality of nodes registered with the network entity, wherein the plurality of nodes comprise at least the apparatus and another apparatus; receiving means for receiving a message with authentication information from the another apparatus, wherein the authentication information is associated with a token for the another apparatus; and performing means for performing an anonymous authentication between the apparatus and the another apparatus based at least in part on the authentication information and the token list.

According to exemplary embodiments, the apparatus in the tenth/twelfth aspect of the present invention may comprise a second node, and the another apparatus in the tenth/twelfth aspect of the present invention may comprise a first node. In accordance with exemplary embodiments, the token for the first node may comprise one of a first token for the first node and at least one backup token of the first token; and the respective tokens for the plurality of nodes may comprise at least: the first token for the first node, the at least one backup token of the first token, a second token for the second node, and at least one backup token of the second token. For example, the authentication information may comprise: a short-lived public key of the first node, and a signature generated by using a short-lived private key of the first node. According to an exemplary embodiment, said performing the anonymous authentication may comprise: verifying the token for the first node based at least in part on the short-lived public key and the token list; and verifying the signature based at least in part on the short-lived public key. Particularly, the anonymous authentication may be performed by batch verification.

In exemplary embodiments of the present invention, the provided methods, apparatus, and computer program products can provide a secure yet anonymous and trustworthy authentication for PSN, which enables anonymity of a message originator and traceability by an authority. Moreover, a backup solution is also proposed to enhance reliability.

BRIEF DESCRIPTION OF THE DRAWINGS

The invention itself, the preferable mode of use and further objectives are best understood by reference to the following detailed description of the embodiments when read in conjunction with the accompanying drawings, in which.

DETAILED DESCRIPTION OF THE INVENTION

The embodiments of the present invention are described in detail with reference to the accompanying drawings. Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

An autonomous communication network such as MANET has a good prospect of becoming a practical platform for instant social activities. MANET is a collection of autonomous nodes which communicate with each other by forming a multi-hop radio network and maintaining connectivity in a decentralized manner. A social group could be instantly formed through MANET by not only people socially connected, but also strangers physically in proximity. For example, a user could chat with strangers nearby to satisfy instant social needs, such as seeking groups for purchase, ride sharing or other social events. Meanwhile, with the rapid growth of mobile Internet, a mobile device has many chances to connect to the Internet, such as at home or a working office or even in public places. Mobile Internet works together with the self-organized ad hoc networks. It becomes very possible and practical to offer mobile users advanced services and applications.

During the instant social activities, users are not necessarily acquaintances but more likely strangers. In this context, it is important to authenticate communication parties and figure out their levels of trust for secure PSN. In PSN, nodes need to be authenticated with each other for secure social communications. Ensuring trustworthy identities will benefit trust assessment and decision making among the nodes, and greatly encourage healthy social networking behaviors. It may be desirable to design a mechanism of efficient authentication for securing PSN and assessing trust in various instant social activities. However, for preserving node user privacy, mostly each node applies pseudonyms during a PSN procedure and frequently changes its pseudonyms (or information related to its identity) to avoid malicious tracking. In case that a pseudonym strategy is applied in a trust management system, a local trust level may be generated according to locally accumulated information and node pseudonyms in PSN. In addition, a more accurate general trust level at a network entity such as a Trusted Server (TS) or a central manager may be generated according to historical accumulated social information and unique node identifiers in order to encourage good behaviors in PSN. The unique node identifiers are only known by the authorized network entity which can map all node pseudonyms to its unique identifier.

As mentioned above, for preserving user privacy in practice, pseudonyms are often applied for the nodes in PSN in order to hide their real identities and avoid malicious privacy tracking. However, adopting and frequently changing pseudonyms badly influence the efficiency of node authentication and key management, as well as trust management. This is because every time the pseudonym changes, new public-private key pairs need to be generated and more importantly should be certified by an authorized party for later authentication and verification. Moreover, the trust level evaluated according to the old pseudonyms needs to be at least mapped to the new one; otherwise the system would easily suffer Sybil attack. Therefore, it is necessary to apply an authentication mechanism to certify the pseudonym and allow it to be verified later on for secure PSN. How to provide an effective and efficient authentication mechanism in PSN and at the same time ensure node privacy and accurate trust management is a challenge. Particularly, for supporting trustworthy PSN, the node trust level evaluated by an authorized party needs to be issued if a new pseudonym is applied to the node. It is required to efficiently authorize and authenticate a trust level together with the new pseudonym of the node.

The pseudonym-based approach proposed for PSN is an idea to help nodes communicate without revealing their real identities. However, the computation cost of signature and certificate verification grows linearly with the load of communications if applying this approach, since every message comprises a public key, a certificate on the public key and a signature using its private key essentially. The public-private key pair needs to be updated each time the node pseudonym is changed, thus the computation load increases linearly with the number of pseudonyms applied. Some schemes propose using a centralized party based authentication to reduce the burden of nodes in MANET, while others propose independent MANET node based authentication. Both the schemes suffer with scalability and message loss problems, as any one entity (such as a node or a centralized party) is solely responsible for key generation and/or verification. This leads to scalability issues when the PSN communication density goes high and the scale of PSN is big.

Thus it can be seen that the privacy enhancement brings an additional challenge on node authentication, key management and trust management since the change of node identifiers would badly influence the accuracy of node trust evaluation and introduce extra load and cost of communications, computations or execution for key and identity managements. In accordance with exemplary embodiments of the present invention, a novel solution is proposed to provide efficient authentication on a pseudonym and a trust level of a node in order to achieve privacy preservation, for example, which can efficiently verify a token containing a newly evaluated trust value and a pseudonym of a node issued by a TS. Particularly, both an authorized party and PSN nodes are employed for authentication according to exemplary embodiments, in order to overcome at least one weakness of existing authentication mechanisms for PSN.

Figure 1:
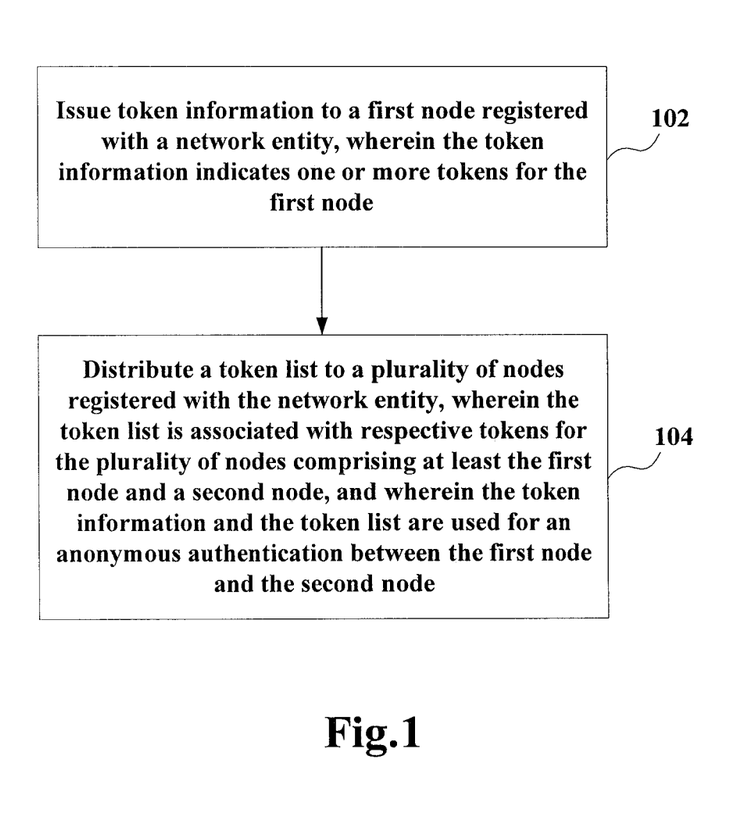
FIG. 1 is a flowchart illustrating a method for anonymous authentication, which may be performed at a network entity as an authorized party in accordance with embodiments of the present invention.

FIG. 1 is a flowchart illustrating a method for anonymous authentication, which may be performed at a network entity as an authorized party in accordance with embodiments of the present invention. For example, the network entity may comprise a trusted service platform, a central manager or a TS which is authorized for social networking participated by a plurality of the nodes. The method illustrated in FIG. 1 may be applicable to a communications network such as MANET, PSN system, mesh network, Peer-to-Peer network and any other mobile network suitable for instant social activities. It is needed for the nodes participating in the instant social activities to be authenticated with each other for secure social communications. The network entity, as an authorized party in the social communications, may provide identity and trust management for the registered nodes (such as a first node, a second node and any other nodes participating in social networking), which may exchange messages between each other during the social communications.

According to exemplary embodiments, the network entity may issue token information to the first node registered with the network entity, as shown in block 102 of FIG. 1, and the token information may indicate one or more tokens for the first node. For example, the one or more tokens for the first node may comprise: a first token for the first node, at least one backup token of the first token, or a combination thereof. In an exemplary embodiment, the first token may comprises: a first validity period, and a pseudonym identifier and a trust value of the first node corresponding to the first validity period. Considering that the network entity may be unavailable when the first node needs to update its current token (for example, update the first token by changing the corresponding pseudonym identifier and/or trust value), the network entity can provide the at least one backup token of the first token to the first node. In an exemplary embodiment, a backup token of the first token may comprise: an extended first validity period, and a pseudonym identifier and a trust value of the first node corresponding to the extended first validity period. The extension of the first validity period may be set randomly or as required. In an exemplary embodiment, the network entity may create the first token by evaluating the trust value during the first validity period and choosing a unique pseudonym identifier for the first node. Similarly, the network entity may create the backup token of the first token by predicting a new trust value during the extended first validity period and optionally choosing another unique pseudonym identifier for the first node. The trust value of the first node corresponding to the extended first validity period may be set based at least in part on an analysis of a change trend within the extended first validity period according to a trust value change pattern generated based at least in part on historical statistics for the first node. As such, the network entity may create one or more backup tokens of the first token for the first node. Particularly, the trust value inside the backup token could be lower than that inside its previous token (such as an original token like the first token, or other backup token created previously for a node) for encouraging a prompt token update. In this case, the node may prefer to update its token in time in order to be treated more trustworthy in PSN.

Figure 5:
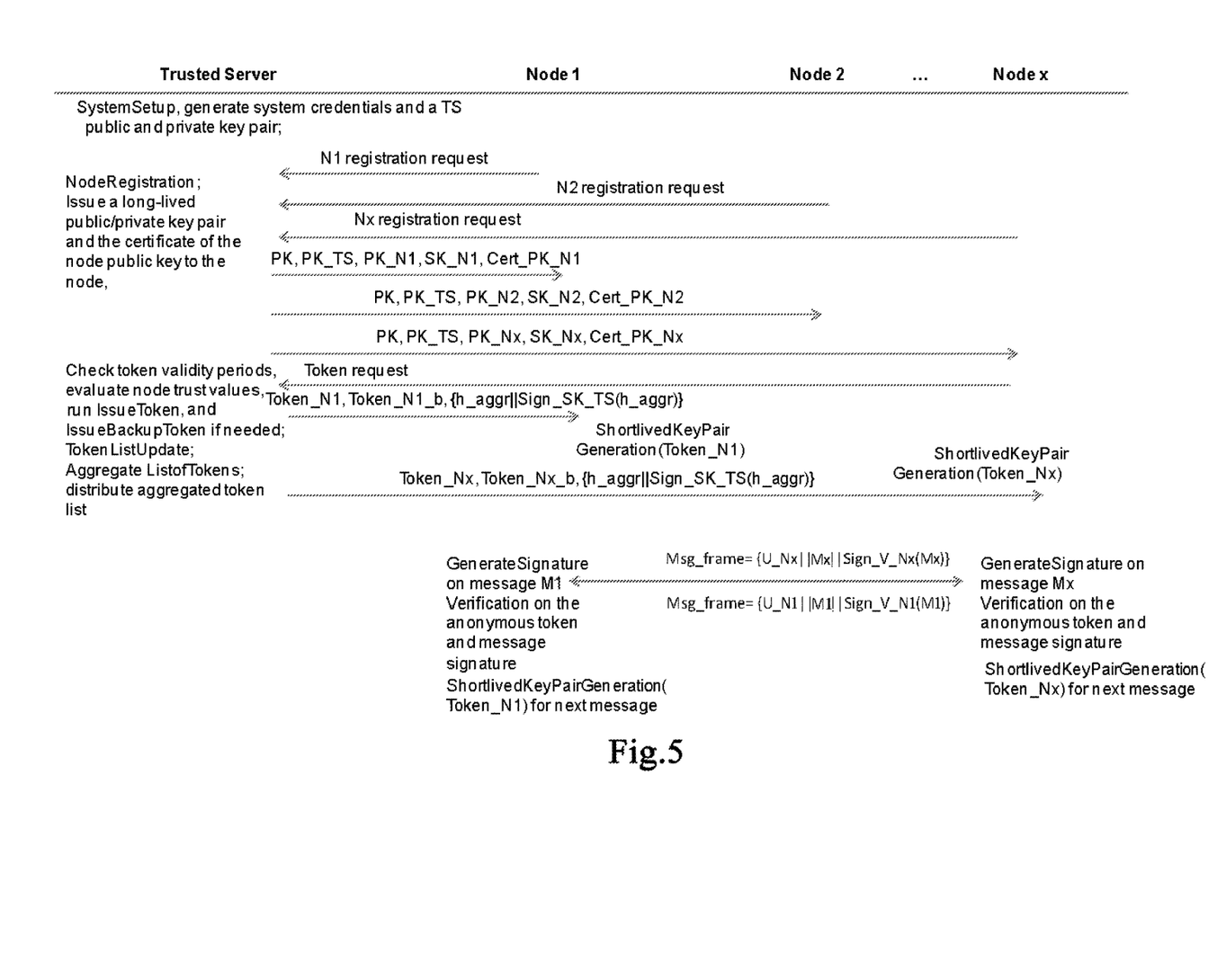
FIG. 5 shows an exemplary procedure of anonymous and trustworthy authentication in PSN in accordance with an embodiment of the present invention.

In accordance with exemplary embodiments, the token information may further indicate one or more token parameters, such as a secret between the network entity and the first node, system credentials and/or registration parameters as illustrated in combination with FIG. 5. The token information may be issued to the first node from the network entity in response to a request from the first node (for example, a request for querying or updating a current token), a trigger event (for example, in an event that the current token is expired) or a trigger time (for example, when a predetermined time for issuing arrives). In an exemplary embodiment, the network entity may issue the token information to the first node, when the first node registered at the network entity with its real identity or identifier (ID), and the first node may obtain some registration parameters and/or system credentials in addition to one or more tokens. Alternatively or additionally, the network entity may check the validity period of the current token of the first node, and if it will be expired or the first node requests, then the network entity may create a new token for the first node. Nodes can continue participating in the social communications by requesting respective new tokens from the network entity when their old tokens are expired, for example, using their respective session keys with the TS. For issuing the new token to the first node, a mutual authentication process may be initiated between the network entity and the first node. For example, this process can be achieved by adopting a Diffie-Hellman key agreement protocol secured with a public key based signature scheme. It will be realized that the network entity can create and issue respective tokens for other registered nodes, in a similar way to the first node. For example, the network entity may create a second token for a second node, which may comprise: a second validity period, and a pseudonym identifier and a trust value of the second node corresponding to the second validity period. When a backup strategy is applied, the network entity may also create at least one backup token of the second token, and a backup token of the second token may comprise: an extended second validity period, and a pseudonym identifier and a trust value of the second node corresponding to the extended second validity period. Similarly, the network entity can issue token information to the second node for indicating one or more tokens for the second node, and update the one or more tokens for the second node as required.

In block 104 of FIG. 1, the network entity may distribute a token list to a plurality of nodes registered with the network entity, wherein the token list may be associated with respective tokens for the plurality of nodes comprising at least the first node and a second node, and the token information for the first node and the token list can be used for an anonymous authentication between the first node and the second node. The respective tokens for the plurality of nodes may comprise at least: the first token for the first node, the at least one backup token of the first token, the second token for the second node, and the at least one backup token of the second token. It can be understood that the respective tokens for the plurality of nodes may further comprise tokens and corresponding backup tokens for other nodes registered with the network entity. The token list can be updated based at least in part on a change of the respective tokens for the plurality of nodes, so that the token list is associated with all valid tokens and their backup tokens which are not expired. For example, when the network entity issues a new token (such as an original token or a backup token), it appends the new token in the token list. Similarly, when a token reaches its expiry time, it will be cut off from the token list. Particularly, if the network entity can update the tokens on time, it may remove both old tokens and their backup tokens from the token list. According to exemplary embodiments, the original tokens and the backup tokens can be associated with the same token list, or with different token lists which may be distributed by the network entity separately. The token list can be distributed by the network entity to the plurality of nodes participating in social networking, in response to a predefined event (for example, once a new update of the token list is done) or a predefined time (for example, when a new distribution or broadcasting period starts). In an exemplary embodiment, the token list may comprise an aggregated list of hashed tokens which is certified by the network entity. For example, the network entity can hash the respective tokens (which are not expired) for the plurality of nodes, aggregate them all and sign the aggregated list of those hashed tokens using its private key.

Figure 2:
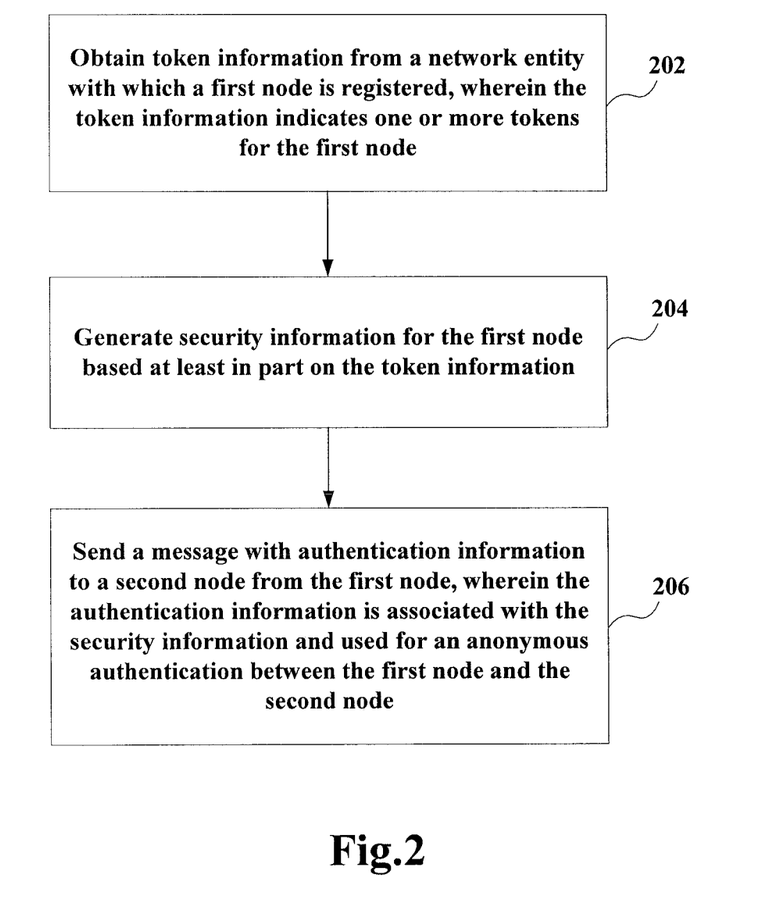
FIG. 2 is a flowchart illustrating a method for anonymous authentication, which may be performed at a first node as a message sender in accordance with embodiments of the present invention.

FIG. 2 is a flowchart illustrating a method for anonymous authentication, which may be performed at a first node as a message sender in accordance with embodiments of the present invention. For example, the first node may comprise a mobile station, a user equipment, a wireless terminal, a personal digital assistant (PDA), a portable device, or any other entity participating in social networking and registered with the network entity as illustrated in the FIG. 1. The first node may conduct social networking by exchanging messages with one or more other nodes (such as a second node). It will be appreciated that although the first node is illustrated as a message sender in connection with FIG. 2, it also can receive and authenticate messages sent from other nodes during social networking communications. The first node can communicate with the network entity in a secure way, for example, register at the network entity with its real ID and obtain some registration parameters and/or system credentials by applying a secure protocol (for example, via Secure Sockets Layer (SSL) or any other suitable protocol for encrypting information over the Internet or cellular networks).

Corresponding to the description with respect to FIG. 1, the first node can obtain token information from the network entity with which the first node is registered, as shown in block 202 of FIG. 2, and the token information may indicate one or more tokens for the first node. In accordance with exemplary embodiments, the one or more tokens for the first node may comprise, for example, a first token for the first node, at least one backup token of the first token, or a combination thereof, as illustrated in connection with FIG. 1. A backup solution is proposed in case that the first node needs to change its current token, but the connection to the network entity is not available. In this case, multiple tokens with different pseudonym identifiers which may be linked to one or more trust values can be created by the network entity and issued to the first node through the token information. In the backup token, the trust value for the first node can be set based at least in part on a trust evolution trend analyzed or estimated by the network entity. The validity period of the backup token may be a random extension (for example, a time slot) relative to that of its original token.

Based at least in part on the token information, security information for the first node can be generated as shown in block 204. Then in block 206, a message with authentication information is sent to the second node from the first node, wherein the authentication information may be associated with the security information and used for an anonymous authentication between the first node and the second node. In an exemplary embodiment, the security information may comprise a short-lived public and private key pair for the first node. Accordingly, the authentication information may comprise: the short-lived public key of the first node, and a signature generated by using the short-lived private key of the first node. For example, the first node can generate its short-lived public/private keys randomly from a given token (such as the first token or the backup token of the first token), according to ID based cryptography. Optionally, the first node can use different key pairs for respective messages sent to the second node for achieving more advanced privacy. Even for the same token, it is possible to generate different key pairs. When the first token is expired, the backup token of the first token may be used to generate a new short-lived public/private key pair for its subsequent messages to the second node. Similarly, messages sent from the first node to other nodes can be secured with corresponding distinct key pairs.

Figure 3:
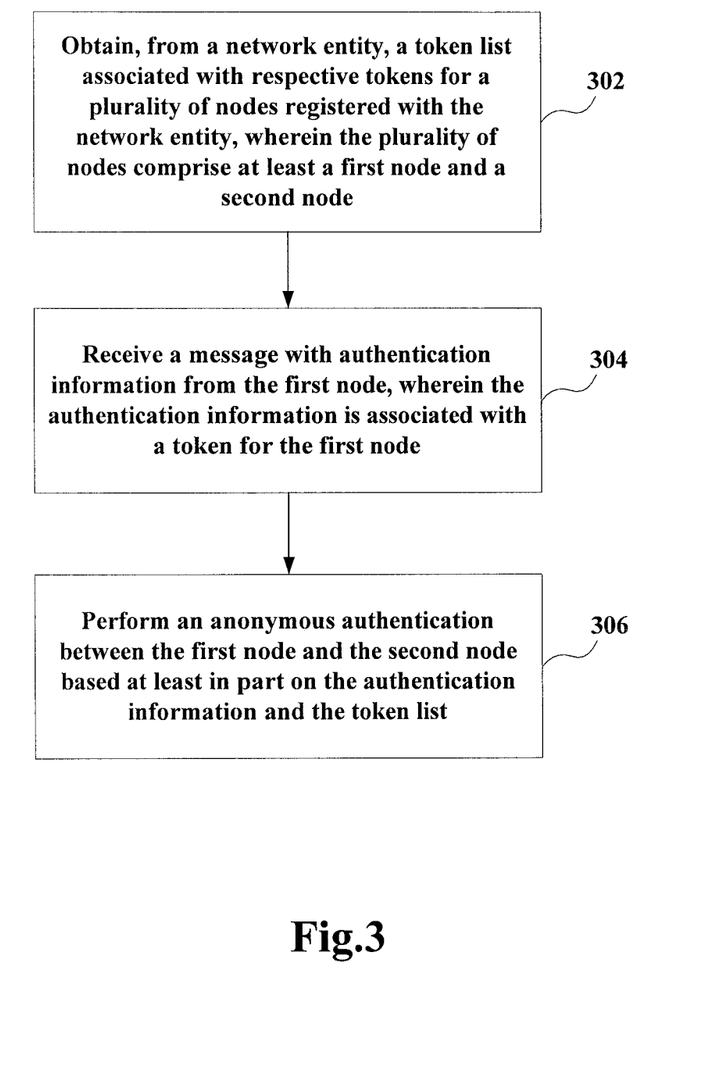
FIG. 3 is a flowchart illustrating a method for anonymous authentication, which may be performed at a second node as a message receiver in accordance with embodiments of the present invention.

FIG. 3 is a flowchart illustrating a method for anonymous authentication, which may be performed at a second node as a message receiver in accordance with embodiments of the present invention. For example, the second node may comprise a mobile station, a user equipment, a wireless terminal, a PDA, a portable device, or any other entity participating in social networking and registered with the network entity as illustrated in the FIG. 1. The second node may conduct social networking by exchanging messages with one or more other nodes (such as the first node). It will be appreciated that although the second node is illustrated as a message receiver in connection with FIG. 3, it also can send messages to be authenticated to other nodes during social networking communications. Similar to the first node, the second node also can communicate with the network entity in a secure way, for example, register at the network entity with its real ID and obtain some registration parameters and/or system credentials by applying a secure protocol (for example, via SSL or any other suitable protocol for encrypting information over the Internet or cellular networks).

Corresponding to the descriptions with respect to FIG. 1 and FIG. 2, from the network entity, the second node can obtain a token list associated with respective tokens for a plurality of nodes registered with the network entity, as shown in block 302, and the plurality of nodes may comprise at least the first node and the second node. From the first node, the second node can receive a message with authentication information which may be associated with a token for the first node, as shown in block 304. According to an exemplary embodiment, the token for the first node may comprise one of a first token for the first node and at least one backup token of the first token. The respective tokens for the plurality of nodes may comprise at least: the first token for the first node, the at least one backup token of the first token, a second token for the second node, and at least one backup token of the second token. For instance, the token list may comprise an aggregated list of hashed tokens which is certified by the network entity, as described in combination with FIG. 1.

Based at least in part on the authentication information and the token list, an anonymous authentication between the first node and the second node can be performed in block 306. In accordance with exemplary embodiments, the anonymous authentication may comprise a verification of whether the trustworthiness of the first node is certified by the network entity and whether the received message is from the first node. As described in combination with FIG. 2, the authentication information may comprise a short-lived public key of the first node, and a signature generated by using a short-lived private key of the first node. Accordingly, the anonymous authentication between the first node and the second node may be performed by: verifying the token for the first node based at least in part on the short-lived public key and the token list; and verifying the signature based at least in part on the short-lived public key. For example, when the second node receives a message sent from the first node, the second node can verify the authenticity of the short-lived public key from the aggregated list of hashed tokens published by the network entity, since the existence of a hashed token inside the aggregated list is in order for performing token verification. Once the genuineness of the token from the received message is confirmed, the second node can undergo signature verification for the corresponding short-lived public key. It is noted that the anonymous authentication in accordance with exemplary embodiments can be performed by batch verification. In batch verification, distinct messages from different nodes can be collectively verified by a receiver. This may be supported by the bilinear maps. Thus, the performance of authentication and signature verification can be greatly improved.

The various blocks shown in FIGS. 1-3 may be viewed as method steps, and/or as operations that result from operation of computer program code, and/or as a plurality of coupled logic circuit elements constructed to carry out the associated function(s). The schematic flow chart diagrams described above are generally set forth as logical flow chart diagrams. As such, the depicted order and labeled steps are indicative of specific embodiments of the presented methods. Other steps and methods may be conceived that are equivalent in function, logic, or effect to one or more steps, or portions thereof, of the illustrated methods. Additionally, the order in which a particular method occurs may or may not strictly adhere to the order of the corresponding steps shown. The solution provided by the present invention can enable an efficient, anonymous and trustworthy authentication in the context of online, mobile or pervasive social networking. In an exemplary embodiment, an authorized network entity (such as a trusted server or service platform) is applied to issue a node with a token which may comprise a node pseudonym ID (in short pseudo), a trust value attached to it and a validity period thereof. Particularly, the token can be updated and distributed by the TS periodically or by request. According to an exemplary embodiment, an aggregated up-to-date token list certified by the TS may be distributed in PSN. Based at least in part on the issued token, the node can generate its short-lived public and private key pair linked to the token (which may for example comprise a pseudo, its trust value and validity period) and this key pair can be frequently changed according to the node's willingness for preserving privacy. The node can generate a signature on its PSN message with the short-lived private key. Other nodes can authenticate the node's pseudo and its linked trust value issued by the TS and verify the signature on the message from the node, by using the token-based short-lived public key and the public token list (which is certified by the TS), in order to achieve a trustworthy and anonymous authentication. In another exemplary embodiment, batch signature verification for all received messages at a receiver node can be achieved. In this case, distinct messages from multiple nodes can be collectively verified by the receiver node at one time for better performance, through only executing verification on a TS certificate of the token list. According to an exemplary embodiment, a backup solution is also provided in order to support such a situation that a PSN node needs to update its current token (for example, change the pseudo ID and/or the trust value), but it cannot connect to the TS. In this case, multiple tokens (comprising a token and its one or more backup tokens) which contain respective pseudo IDs linked to one or more trust values can be issued by the TS to the node at one time. For example, the trust values linked to the pseudo IDs of the node in the backup tokens can be set based at least in part on a trust evolution trend analyzed or estimated by the TS. On the other hand, the TS may distribute the token list which comprises all valid tokens and the backup tokens thereof to all PSN nodes. The TS can manage the token list by appending new valid tokens, backup tokens and removing invalid ones, and then distributing the up-to-date token list to all PSN nodes. If the tokens can be updated on time by the TS, the TS may remove both old tokens and the backup tokens thereof from the token list.

Figure 4:
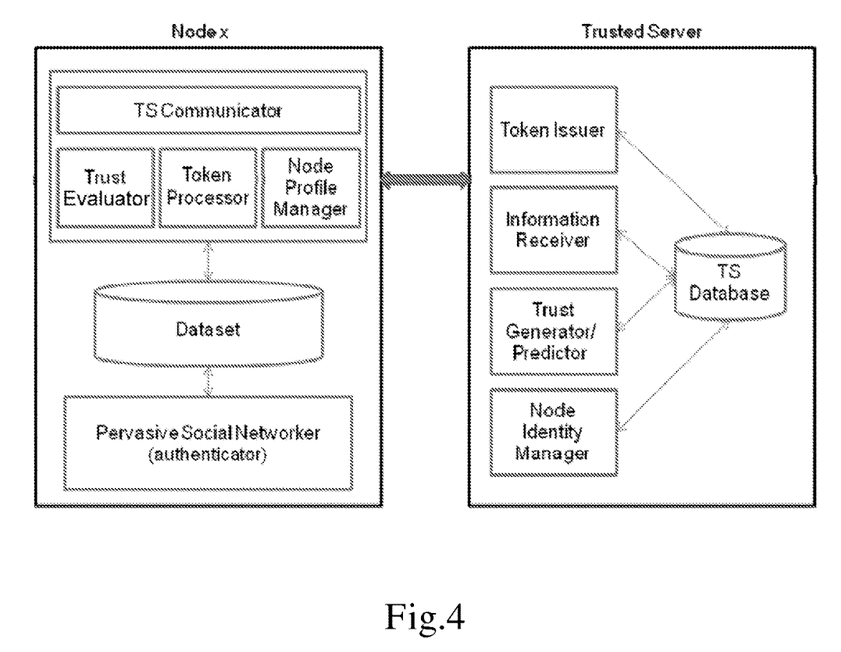
FIG. 4 shows an exemplary system structure in accordance with an embodiment of the present invention.

FIG. 4 shows an exemplary system structure in accordance with an embodiment of the present invention. Although FIG. 4 merely illustrates the system structure in the context of PSN, it will be realized that the solution proposed in accordance with exemplary embodiments also can be applied into any other system suitable for social networking. FIG. 4 exemplarily shows a PSN system which involves two different kinds of entities: PSN nodes (such as Node x shown in FIG. 4) which may interact with each other for instant social communications; and a network entity (such as Trusted Server (TS) shown in FIG. 4) which may be trusted to provide identity and trust managements for the PSN nodes. For example, the TS may have functionalities and capabilities which the PSN nodes do not have, and can collect sufficient information to conduct accurate trust evaluations. As integrity and/or confidentiality are crucial for some instant social communications, it is important to authenticate node trustworthiness and identifiers to ensure secure and trustworthy communications and support trust evolutions. To save computation resources and processing burdens, the PSN nodes may resort to the TS, for example through mobile Internet, to manage identities, keys and trust relationships for ensuring secure PSN communications in various situations.

In the system structure illustrated in FIG. 4, a node (denoted as Node x in FIG. 4) may comprise a pervasive social networker, a TS communicator, a trust evaluator, a token processor, a dataset and a node profile manager. In accordance with exemplary embodiments, the pervasive social networker (for example, a set of PSN applications) can provide a user interface for a user of the node to do social networking. For the pervasive social networker, one of its important functions may be to authenticate messages, identities and trust values from other nodes during PSN communications. The TS communicator can communicate with the TS in a secure way by applying a secure protocol (for example via SSL). Particularly, the TS communicator can request and receive from the TS one or more tokens which may contain one or more pseudo IDs and trust values attached to them, as well as validity periods. Within the PSN system, the TS can distribute an up-to-date aggregated token list that may contain all valid tokens with its certification. A token issued by the TS may comprise a node pseudo ID, a trust value and a validity period thereof. The trust evaluator can evaluate a trust value for the node, for example, according to the issued trust value and locally accumulated information and knowledge. The token processor can process the token list distributed by the TS and generate a short-lived public-private key pair based at least in part on the current token of the node (for example, from the current pseudo ID and trust value). The dataset may store data related to the functional modules/elements/units at the node in a secure manner. In addition, the node profile manager can be used to maintain personal information of the user. For example, the node profile manager can communicate with the TS to register the node into the trust management system and manage various credentials for the node.

The TS illustrated in FIG. 4 may comprise a trust generator/predictor, a token issuer, a node identity manager, an information receiver and a database. In accordance with exemplary embodiments, the trust generator/predictor can assess trust values for respective nodes, and identify malicious nodes. The token issuer can manage and distribute tokens and/or token lists to PSN nodes periodically or by request. The node identity manager can handle node registration, manage system keys and credentials, and generate new node pseudonyms (for example, by request or periodically). The information receiver can communicate with one or more nodes, for example, collect and process reports or data from the nodes, and save the processed data into the database at the TS. The database can save respective tokens of a plurality of nodes and the unique identifiers and other information for the respective nodes. The system structure and various components shown in FIG. 4 are only illustrative and not intended to suggest any limitation as to the scope of use or functionality of embodiments of the invention described herein. It could be understood that the system and the corresponding functionalities illustrated in FIG. 4 may be implemented by adding, deleting or replacing some components with respective to those shown in FIG. 4, or by combining or sub-dividing functionalities of those components.

FIG. 5 shows an exemplary procedure of anonymous and trustworthy authentication in PSN in accordance with an embodiment of the present invention. For participating PSN activities, PSN nodes may register with a TS that is authorized for the PSN before joining in the PSN. For example, the TS may be in charge of checking respective identities and providing security keys (such as a long-term public/private key pair) for the registered nodes. In addition, the TS may set up system parameters for these nodes, which may be preloaded with a public key according to a specified system scheme. Table 1 summarizes some notions used for exemplarily illustrating the procedures of system setup and message authentication between PSN nodes.

TABLE 1

Notation Description

| Notation | Description | Usage |
|---|---|---|
| PK | The system public key shared with all system entities | |
| s | The secret between TS and a node | |
| Nx | Node x, where x is natural number | Used for denoting any PSN node |

TABLE 1-continued

Notation Description

| Notation | Description | Usage |
|---|---|---|
| PK_Nx | The long term public key of Nx | Used for authentication between TS and node Nx |
| SK_Nx | The corresponding long term private key of Nx | |
| PID_Nx | The short-lived pseudo of Nx | |
| TV_Nx | The short-lived trust value of Nx | |
| T_Token_Nx | The validity period of Token_Nx | |
| Token_Nx | The short-lived token of Nx | For example, Token_Nx = {PID_Nx, TV_Nx, T_Token_Nx} |
| Cert_PK_Nx | The TS's certificate on Nx's long-term public key | |
| U_Nx | The short-lived public key of Nx | |
| V_Nx | The short-lived private key of Nx | |
| PK_TS | The public key of TS | |
| SK_TS | The corresponding private key of TS | |
| K | The session key between a node and TS | |
| h(.) | A one way hash function, for example, SHA-1 | |
| H(.) | A Map-to-Point hash function, for example, H: $\{0, 1\}^* \rightarrow G1$ | G1 is an additive group of prime order q |
| h_aggr | The up-to-date aggregated token list | For example, h_aggr = {h(Token_N1), h(Token_N2), ..., h(Token_Nx), ...} |

As shown in FIG. 5, the procedures of system setup and anonymous authentication in PSN may involve several algorithms and/or processes, for example, comprising but not limit to the processes of SystemSetup, NodeRegistration, IssueToken, IssueBackupToken, ShortlivedKeyPairGeneration, SignatureGeneration, AggregateListofTokens, Verification, and/or TokenListUpdate, in accordance with an exemplary embodiment. During the process of SystemSetup at the TS, one or more system keys and/or credentials may be generated and respective system entities (such as Node 1, Node 2, Node x and so on) can be preloaded with the system keys and/or credentials at registration. The system keys and/or credentials may comprise system public key, for example PK={G1, G2, q, P}, which is shared with all system entities (such as the TS and registered nodes), where G1 denotes an additive group of prime order q, G2 denotes a multiplicative group of the same order, P is a generator of G1, and ê: $G1 \times G1 \rightarrow G2$ represents a bilinear mapping between G1 and G2. The system may be initiated by generating a public/private key pair for the TS. The public key of TS (such as PK_TS) may be provided to each registered node (such as Node 1, Node 2, Node x and so on), and the TS keeps the corresponding private key (such as SK_TS) secret by itself. In the process of NodeRegistration, a PSN node can be registered at the TS with its real ID, for example Nx for Node x. The TS may generate and issue a long term public and private key pair (such as PK_Nx and SK_Nx) to the PSN node during its registration, for example, according to a secure protocol. Meanwhile, the TS also can provide a certificate (such as Cert_PK_Nx) on the node's public key signed by it.

In the process of IssueToken, the TS may check the validity period of a current token of a node (such as Nx), if it will be expired or the node requests, the TS may evaluate a trust value, generate a new pseudo and create a new token for this node, for example, Token_Nx={PID_Nx, TV_Nx, T_Token_Nx} for Nx, and then issue this new token to the node. For issuing the token, the node may send its long-term public key certificate (such as Cert_PK_Nx) which was signed by the TS and a random number (such as r1) to the TS, in order to initiate a mutual authentication process. For example, after authenticating PK_Nx from Cert_PK_Nx, the TS may choose r2 as its share to establish a shared session key (such as K) between Nx and TS. This process can be achieved by adopting a Diffie-Hellman key agreement protocol secured with a public key based signature scheme. Besides, the TS can choose a unique pseudo for the requesting node (such as PID_Nx for Nx) and send token information (such as {Token_Nx, s, Q=sP}) to this node. In order to avoid the situation where a new token cannot be issued due to unavailability of the TS, the TS could issue one or more backup tokens to the node in the process of IssueBackupToken. For example, the backup token for Nx can be described as Token_Nx_b={PID_Nx_b, TV_Nx_b, T_Token_Nx_}, where PID_Nx_b may be a pseudo different from PID_Nx, T_Token_Nx_b may be an extension of T_Token_Nx for a random time period (such as a time slot), and TV_Nx_b may be different from TV_Nx. The value of TV_Nx_b can be set by the TS according to an analysis and estimation of a change trend of the trust value within the extended time slot considering a trust value change pattern based at least in part on the historical statistics for the node. For example, Token_Nx_b can be issued to Nx in the same way as Token_N and optionally at the same time. The extended time slot in Token_Nx_b can be set in order to simplify the token list update and distribution.

With the issued token, the node can generate anonymous short-lived public/private keys in the process of ShortlivedKeyPairGeneration, in order to send PSN messages to other nodes. For example, after getting Token_Nx and/or Token_Nx_b, the node Nx can generate its short-lived public/private keys (which may be denoted as U_Nx and V_Nx respectively) randomly from the given token (Token_Nx or Token_Nx_b), according to ID based cryptography. The short-lived public key U_Nx may comprise U1_Nx and U2_Nx, where U1 and U2 are cipher texts of the ElGamal encryption algorithm. Similarly, the short-lived private key V_Nx may comprise V1_Nx and V2_Nx. In an exemplary embodiment, the key pair generation may be performed by inputting Token_Nx (or Token_Nx_b) from the TS and outputting the short-lived anonymous public/private key pair U_Nx and V_Nx. For example, the short-lived public key U_Nx can be computed as:

$$U1\_Nx = \text{Token}\_Nx \cdot a \cdot P \qquad (1)$$

$$U2\_Nx = h(\text{Token}\_Nx) \oplus H(\text{Token}\_Nx \cdot a \cdot Q) \qquad (2)$$

where h(•) represents a one way hash function and H(•) represents a Map-to-Point hash function as shown in Table 1, parameter "a" is a random nonce, parameters "P" and "Q" are credentials as described with respect to the processes of SystemSetup and IssueToken, and symbol "⊕" represents an XOR operation. Accordingly, the corresponding short-lived private key V_Nx can be computed as:

$$V1\_Nx = s \cdot U1\_Nx \qquad (3)$$

$$V2\_Nx = s \cdot H(U1\_Nx \| U2\_Nx) \qquad (4)$$

where parameter "s" represents the secret between TS and Nx, and symbol "∥" represents a concatenation operation. The above computations may be conducted at node Nx after getting the token from the TS and when the node needs to communicate with another node using a new key pair. In order to generate unique key pairs for respective messages, the random nonce "a" can be changed each time the node generates a short-lived public/private key pair. Thus, even for the same token, it is possible to generate different key pairs for achieving more advanced privacy, for example, using different key pairs for respective messages sent out in PSN. The node can balance between computation cost and its privacy demand.

When the node wants to send a message, it may compute a signature on the message using the short-lived private key in the process of SignatureGeneration. For example, the node Nx can compute a signature Sign_V_Nx on message Mx using its short-lived private key V_Nx=(V1_Nx, V2_Nx) in such a way that Sign_V_Nx(Mx)=V1_Nx·Mx+V2_Nx. Then Nx sends Mx to one or more other nodes, for example, with a message frame format as: {U_Nx∥Mx∥Sign_V_Nx(Mx)}. When Token_Nx is expired, the node Nx could use its backup token for a while, and accordingly generate a new short-lived key pair by choosing a distinct random nonce "a" for signing its subsequent messages.

In the process of AggregateListofTokens according to an exemplary embodiment, the TS may periodically distribute or broadcast an aggregated list of issued token hashes to the PSN nodes. For example, the TS may first hash the tokens not expired, aggregate them all (which may be denoted as h_aggr={h(Token_N1), h(Token_N2), . . . , h(Token_Nx), . . . }), and then sign the aggregated token hashes using its private key (such as SK_TS) and output the signed list as {h_aggr∥Sign_SK_TS(h_aggr)}. The PSN node can continue participating in the PSN communications when its old tokens are expired, by requesting a new token from the TS using its session key K (which may be different in respective communication sessions) with the TS. When issuing the new token to the node, the TS may append the hashed new token in the aggregated list of token hashes in the process of TokenListUpdate. Similarly, when a token reaches its expiry time, its hash would be cut off from the aggregated list. The up-to-date aggregated list can be distributed to each PSN node from the TS once a new update is done.

When a node receives messages sent from other nodes, the node as a receiver can verify the authenticity of the short-lived public keys in the process of Verification, from the aggregated list of token hashes published by the TS. For example, when receiving a message from the node Nx, the receiver first computes the token hash h(Token_Nx) of a short-lived public key U_Nx (which can be extracted from the public key U_Nx) and compares it with the one inside the aggregated list since its existence is for doing the token verification. Once the genuineness of the token from the received message is confirmed by the receiver according to the aggregated list of token hashes, the receiver undergoes verification of a signature for the corresponding short-lived public key. The authentication of the signature in the message can be carried out by using the short-lived public key of the sender attached in the message. For example, using system public parameters {G1, G2, q, P} assigned by the TS and token parameters {s, Q}, the receiver can verify the signature of the sender. In other words, the process of Verification can verify that the trustworthiness of the sender is certified by the TS and that the received message is from the sender which signed the message. In another exemplary embodiment, batch verification can be supported at the receiver. In this case, distinct messages from multiple nodes can be collectively verified by the receiver, which may be supported by the bilinear maps. Thus, the performance of authentication and signature verification can be greatly improved.

An exemplary procedure of anonymous and trustworthy authentication between PSN nodes (such as Node 1 and Node x) is illustrated here in combination with FIG. 5. During the system initiation, the TS may generate system credentials (such as PK, a public/private key pair like PK_TS and SK_TS of the TS), as described with respect to the process of SystemSetup. A plurality of nodes wishing to participate in PSN, shown in FIG. 5 as Node 1, Node 2, Node x and so on, may register into the system, for example, by requesting the TS for registration with their unique identifiers (such as N1, N2, Nx and so on). In this case, the TS can register a node by generating a long-lived public/private key pair (such as {PK_N1, SK_N1}, {PK_N2, SK_N2}, {PK_Nx, SK_Nx} or the like), and issue the long-lived public/private key pair, one or more system credentials (such as PK, PK_TS and so on), and a certificate of the long-lived public key (such as Cert_PK_N1, Cert_PK_N2, Cert_PK_Nx or the like) to the node in a secure way. In an exemplary embodiment, the PSN nodes, such as Node 1 and Node x, may interact with each other for instant social communications. Then Node 1 and Node x could request the TS for their respective anonymous tokens for an anonymous and trustworthy authentication. For example, a token may comprise a pseudo, its attached trust value and a validity period of the token. Alternatively or additionally, the TS can check the validity period of the issued token in order to decide if it is needed to issue a new token. If needed, the TS generates one or more new tokens with corresponding new pseudos and trust values, for example in the process of IssueToken and/or the process of IssueBackupToken, which may be applied considering that the TS could not be always available. By setting and utilizing the validity period of the token, the TS can append new tokens (and backup tokens if any) to and remove invalid ones from the token list in the process of TokenListUpdate. Accordingly, the TS can generate hashes of all valid tokens in the process of AggregateListofTokens. As such, the TS issues token information, for example comprising the new tokens (such as Token_N1, Token_N1_b, Token_Nx, Token_Nx_b and/or the like) and the related parameters (such as s, Q and/or the like), to the respective nodes (for example, by applying a session key). The TS also distributes or broadcasts the aggregated list of hashed tokens (for example, in a form of {h_aggr∥Sign_SK_TS(h_aggr)}) to all PSN nodes in a secure way. Alternatively or additionally, the TS may distribute or broadcast the aggregated list of hashed tokens periodically and/or when the aggregated list is updated. When getting the issued token, the PSN node may generate its short-lived public/private key pair in the process of ShortlivedKeyPairGeneration, based at least in part on the issued token which may comprise a new pseudo. With the short-lived public/private key pair, the node (such as Node 1 and Node x) can sign its message (such as M1 and Mx) in the process of SignatureGeneration, and authenticate a message from another node by verifying the corresponding anonymous token and the validity of a message signature. Optionally, the node can generate a distinct short-lived public/private key pair for a next message, which may achieve more advanced privacy.

Many advantages can be obtained by the solution presented in accordance with the exemplary embodiments. For example, in an aspect of privacy preservation and anonymous authentication, the TS in the proposed solution can authenticate a node (such as Nx) through its long-term public key's certificate, since it is signed by the TS's private key. By this way, the real identity of the node is preserved within the TS. The short-lived public keys that are used for sending messages in PSN are generated from a token given by the TS, which has no trace of the long-term public key since the pseudo inside the token is unlinked to the real identity of the node. All the pseudonym IDs for the node are generated by selecting different random values and the node changes the random nonce each time when it generates the short-lived key pair linked to a token. The short-lived key pair could be unique even for each message. With this way, the node privacy can be carefully preserved. In terms of anonymous authentication, the TS periodically broadcasts or distributes the aggregated list of hashed valid tokens signed by its long-term private key to the PSN nodes. Therefore, a PSN node can trust a short-lived public key, its linked trust value and validity period if the corresponding token hash extracted from the short-lived public key is present in the aggregated list of token hashes from the TS. Thus, the proposed scheme provides a secure yet anonymous and trustworthy authentication for PSN. In an aspect of unlinkability and traceability, any message recipient in PSN cannot link two or more messages sent from a node to other nodes if applying different tokens. Unlinkability of a message to its originator provides anonymity. On the other hand, the authority (such as TS) is able to trace the sender of the message by mapping the message's token with the real identity of the sender in case of any liability investigation. Therefore, the proposed solution preserves a conditional privacy, which is one of the acceptable and desired properties in PSN. For example, the anonymity of the message originator and traceability by the authorities may be assured as follows. A short-lived anonymous public key of each node involved in sending messages is based at least in part on the token issued by the TS. This short-lived anonymous public key is computed at the node with a random number that would be changed by the node for every different message. This guarantees a unique short-lived public key at each time of a PSN activity. Moreover, the token of a node cannot be retrieved from its hash because of the irreversible property of one-way hash chains. Therefore, a receiver cannot link any two short-lived public keys that are generated from the same token. On the other hand, an identity disclosure is performed only when solving a dispute. In case of any dispute concerning a message, the TS first fetches the token hash in the accused message, in order to find the real token value of the message sender. Later, it extracts the long term public key of the responsible node. The TS then can find out the real identity of the node to sanction any penalties in view of legal considerations. In an aspect of scalability and low overhead, a public key certificate is not required as the public keys can be authenticated from the aggregated list of token hashes distributed by the TS. This only requires a TS signature in the list to be verified once for different messages of multiple nodes. Therefore, verification overhead can be dramatically reduced by excluding the certificate verification for a PSN message, which improves the scalability of the system. The computation and communication overhead would not increase linearly with the number of messages in the PSN. Therefore, the proposed solution is efficient in terms of small computation overhead and acceptable communication latency. In an aspect of authentication of multiple contents, the proposed solution supports authentication on node pseudonyms and trust values, as well as their validity periods. The token itself may be part of a PSN communication message among nodes. Its integrity and correctness can be verified through node authentication, hash matching, and signature verification in a batch. It can be flexibly extended to authenticate any information issued by the TS in PSN. In an aspect of reliability, since a backup token scheme is provided to handle the case that the TS may be unavailable if a token update is needed, the proposed solution is reliable especially in terms of unavailability of the TS. On the other hand, the solution can encourage a prompt token update since a trust value inside a backup token could be lower than that in its previous token. Thus, the node may prefer to update its token in time in order to be treated as trusted in PSN.

Figure 6:
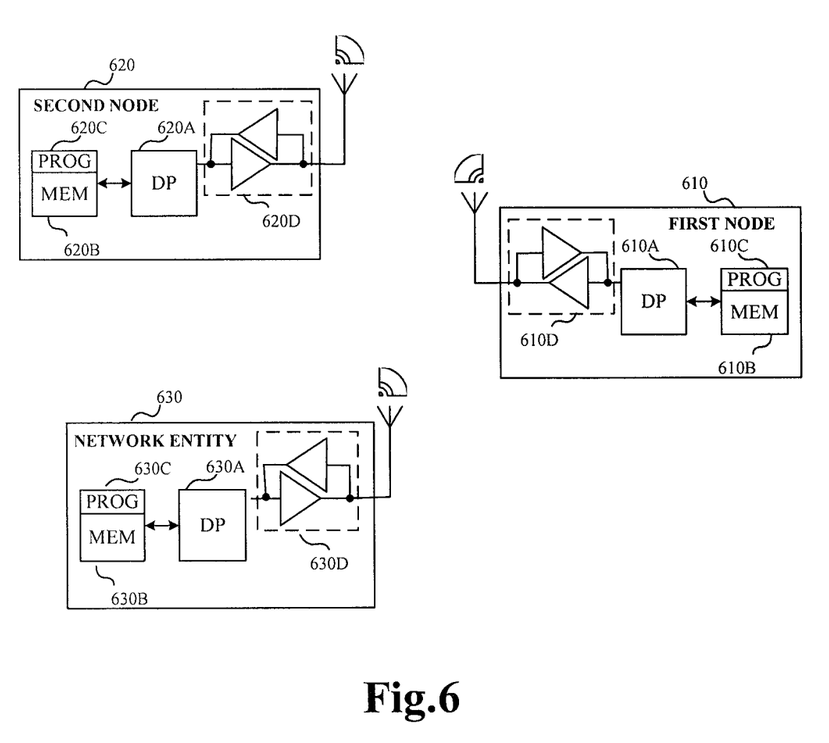
FIG. 6 is a simplified block diagram of various apparatuses which are suitable for use in practicing exemplary embodiments of the present invention.

FIG. 6 is a simplified block diagram of various apparatuses which are suitable for use in practicing exemplary embodiments of the present invention. In FIG. 6, a network entity 630 (such as a TS, a trusted service platform, a central manager or the like) may be authorized for social communications such as PSN participated by a plurality of nodes (such as a first node 610 and a second node 620). The first node 610 and the second node 620 (such as a mobile station, a user equipment, a wireless terminal, a PDA, a portable device, etc.) may be adapted for communicating with each other directly or through an intermediate entity (not shown in FIG. 6). In an exemplary embodiment, the network entity 630 may comprise a data processor (DP) 630A, a memory (MEM) 630B that stores a program (PROG) 630C, and a suitable transceiver 630D for communicating with an apparatus such as another network entity, a communication node (such as the first node 610 and the second node 620), a server, a database and so on. The first node 610 may comprise a data processor (DP) 610A, a memory (MEM) 610B that stores a program (PROG) 610C, and a suitable transceiver 610D for communicating with an apparatus such as the second node 620, a network entity 630, a server, a database or other network devices (not shown in FIG. 6). Similarly, the second node 620 may comprise a data processor (DP) 620A, a memory (MEM) 620B that stores a program (PROG) 620C, and a suitable transceiver 620D for communicating with an apparatus such as the first node 610, the network entity 630 or other network devices (not shown in FIG. 6). For example, at least one of the transceivers 610D, 620D, 630D may be an integrated component for transmitting and/or receiving signals and messages. Alternatively, at least one of the transceivers 610D, 620D, 630D may comprise separate components to support transmitting and receiving signals/messages, respectively. The respective DPs 610A, 620A and 630A may be used for processing these signals and messages.

Alternatively or additionally, the first node 610, the second node 620 and the network entity 630 may comprise various means and/or components for implementing functions of the foregoing steps and methods in FIGS. 1-5. For example, the network entity 630 may comprise: issuing means for issuing token information to a first node (such as the first node 610) registered with the network entity, wherein the token information indicates one or more tokens for the first node; distributing means for distributing a token list to a plurality of nodes registered with the network entity, wherein the token list is associated with respective tokens for the plurality of nodes comprising at least the first node and a second node (such as the second node 620), and the token information and the token list are used for an anonymous authentication between the first node and the second node. In an exemplary embodiment, the first node 610 may comprise: obtaining means for obtaining token information from a network entity (such as the network entity 630) with which the first node is registered, wherein the token information indicates one or more tokens for the first node; generating means for generating security information for the first node based at least in part on the token information; and sending means for sending a message with authentication information to a second node (such as the second node 620) from the first node, wherein the authentication information is associated with the security information and used for an anonymous authentication between the first node and the second node. In another exemplary embodiment, the second node 620 may comprise: obtaining means for obtaining, from a network entity (such as the network entity 630), a token list associated with respective tokens for a plurality of nodes registered with the network entity, wherein the plurality of nodes comprise at least a first node (such as the first node 610) and the second node; receiving means for receiving a message with authentication information from the first node, wherein the authentication information is associated with a token for the first node; and performing means for performing an anonymous authentication between the first node and the second node based at least in part on the authentication information and the token list.

At least one of the PROGs 610C, 620C, 630C is assumed to comprise program instructions that, when executed by the associated DP, enable an apparatus to operate in accordance with the exemplary embodiments, as discussed above. That is, the exemplary embodiments of the present invention may be implemented at least in part by computer software executable by the DP 610A of the first node 610, by the DP 620A of the second node 620 and by the DP 630A of the network entity 630, or by hardware, or by a combination of software and hardware.

The MEMs 610B, 620B and 630B may be of any type suitable to the local technical environment and may be implemented using any suitable data storage technology, such as semiconductor based memory devices, flash memory, magnetic memory devices and systems, optical memory devices and systems, fixed memory and removable memory. The DPs 610A, 620A and 630A may be of any type suitable to the local technical environment, and may comprise one or more of general purpose computers, special purpose computers, microprocessors, digital signal processors (DSPs) and processors based on multi-core processor architectures, as non-limiting examples.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

It will be appreciated that at least some aspects of the exemplary embodiments of the inventions may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, random access memory (RAM), etc. As will be realized by one of skills in the art, the functionality of the program modules may be combined or distributed as desired in various embodiments. In addition, the functionality may be embodied in whole or in part in firmware or hardware equivalents such as integrated circuits, field programmable gate arrays (FPGA), and the like.

Although specific embodiments of the invention have been disclosed, those having ordinary skills in the art will understand that changes can be made to the specific embodiments without departing from the spirit and scope of the invention. The scope of the invention is not to be restricted therefore to the specific embodiments, and it is intended that the appended claims cover any and all such applications, modifications, and embodiments within the scope of the present invention.

What is claimed is:

1. An apparatus, comprising:
at least one processor; and
at least one memory comprising computer program code, the at least one memory and the computer program code configured to, with the at least one processor, cause the apparatus to at least:
issue token information to a first node registered with the apparatus, wherein the token information indicates a first token and a backup token to enable the first node to change from the first token to the backup token for anonymous authentication, the first token including a first validity period for the first token, a first pseudonym identifier to enable the anonymous authentication of the first node with a second node, a first trust value for the first validity period, and the backup token including a second validity period for the backup token, a second pseudonym identifier to enable the anonymous authentication of the first node, and a second trust value for the second validity period, the first token and the backup token being issued at the same time as part of the token information; and
distribute a token list to a plurality of nodes registered with the apparatus, wherein the token list is associated with tokens for the plurality of nodes comprising at least the first node and a second node, and wherein the token information and the token list enable the anonymous authentication between the first node and the second node, wherein the backup token is used for the anonymous authentication between the first node and the second node after the first validity period has expired and the apparatus is unavailable to the first node and/or the second node.

2. The apparatus according to claim 1, wherein the second trust value of the backup token is less than the first trust value of the first token in order to trigger the first node return to the apparatus for issuance of additional token information, and wherein the backup token enables the first node to change the anonymous authentication to the second pseudonym identifier.

3. The apparatus according to claim 2, wherein at least a portion of the first token enables the first node to generate security information including a short-lived public and private keys for the anonymously authenticate to the second node, the security information enabling the first node to anonymous authentication over a mobile ad hoc network with the second node in order to access a social network.

4. The apparatus according to claim 3, wherein the second trust value of the first node corresponds to an extension to the first validity period, wherein the second trust value is set based at least in part on a trust value change pattern generated based at least in part on historical statistics for the first node.

5. The apparatus according to claim 1, wherein the token list is updated based at least in part on a change of the tokens for the plurality of nodes.

6. The apparatus according to claim 1, wherein the token list comprises an aggregated list of hashed tokens certified by the apparatus.

7. The apparatus according to claim 1, wherein the apparatus comprises a trusted server configured to at least provide token information to enable the anonymous authentication between at least the first node and the second node participating in a social network.

8. An apparatus, comprising:
at least one processor; and
at least one memory comprising computer program code, the at least one memory and the computer program code configured to, with the at least one processor, cause the apparatus to at least:
obtain token information from a network entity with which the apparatus is registered, wherein the token information indicates a first token and a backup token to enable the apparatus to change from the first token to the backup token for anonymous authentication, the first token including a first validity period for the first token, a first pseudonym identifier to enable the anonymous authentication of the apparatus with a second node, a first trust value for the first validity period, and the backup token including a second validity period for the backup token, a second pseudonym identifier to enable the anonymous authentication of the apparatus, a second trust value for the second validity period, the first token and the backup token being obtained at the same time as part of the token information;
generate security information for the apparatus based at least in part on the backup token information in response to the first validity period expiring and the network entity being unavailable to the apparatus and/or the second node; and
send a message with authentication information to the second node, wherein the authentication information is associated with the security information and used for an anonymous authentication between the apparatus and the second node.

9. The apparatus according to claim 8, wherein the apparatus is further configured to at least send the message over a mobile ad hoc network in order to access a social network.

10. The apparatus according to claim 9, wherein at least a portion of the first token enables the apparatus to generate security information including a short-lived public and private keys for the anonymous authentication to the second node.

11. The apparatus according to claim 10, wherein the authentication information comprises the short-lived public key of the apparatus, and a signature generated by using the short-lived private key of the apparatus.

12. A non-transitory a computer-readable medium including computer program code which when executed by at least one processor causes operations comprising:
obtaining token information from a network entity with which a first node is registered, wherein the token information indicates a first token and a backup token to enable the first node to change from the first token to the backup token for anonymous authentication, the first token including a first validity period for the first token, a first pseudonym identifier to enable the anonymous authentication of the first node with a second node, a first trust value for the first validity period, and the backup token including a second validity period for the backup token, a second pseudonym identifier to enable the anonymous authentication of the first node, a second trust value for the second validity period, the first token and the backup token being obtained at the same time as part of the token information;

generating security information for the first node based at least in part on the backup token information in response to the first validity period expiring and the network entity being unavailable to the first node and/or the second node; and sending a message with authentication information to the second node from the first node, wherein the authentication information is associated with the security information and used for the anonymous authentication between the first node and the second node.

* * * * *